(12) United States Patent
Prado et al.

(10) Patent No.: US 11,490,560 B2
(45) Date of Patent: Nov. 8, 2022

(54) FERTILIZER METER WITH MOTOR CONTROL AND METHOD THEREOF

(71) Applicant: DEERE & COMPANY, Moline, IL (US)

(72) Inventors: Cristian T. Prado, Horizontina (BR); Brandon M. McDonald, Johnston, IA (US); Donald K. Landphair, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 365 days.

(21) Appl. No.: 16/507,613

(22) Filed: Jul. 10, 2019

(65) Prior Publication Data

US 2021/0007274 A1 Jan. 14, 2021

(51) Int. Cl.
| | |
|---|---|
| A01C 15/16 | (2006.01) |
| A01C 15/00 | (2006.01) |
| A01C 19/02 | (2006.01) |
| A01C 21/00 | (2006.01) |
| A01C 7/06 | (2006.01) |

(52) U.S. Cl.
CPC ............ *A01C 15/16* (2013.01); *A01C 15/003* (2013.01); *A01C 15/007* (2013.01); *A01C 19/02* (2013.01); *A01C 21/00* (2013.01); *A01C 7/06* (2013.01)

(58) Field of Classification Search
CPC ..... A01C 15/16; A01C 15/003; A01C 15/007; A01C 19/02; A01C 21/00; A01C 15/00; A01C 15/006; A01C 15/005; A01C 19/00; A01C 7/06; A01C 7/00
See application file for complete search history.

(56) References Cited

U.S. PATENT DOCUMENTS

| | | | |
|---|---|---|---|
| 9,936,626 B2 | 4/2018 | Chahley et al. | |
| 2014/0130724 A1* | 5/2014 | Friggstad | A01C 15/00 111/174 |
| 2016/0120107 A1 | 5/2016 | Chahley et al. | |
| 2016/0207018 A1* | 7/2016 | Montag | G01F 13/005 |
| 2017/0273235 A1 | 9/2017 | Kordick | |

FOREIGN PATENT DOCUMENTS

| | | |
|---|---|---|
| AU | 2011235946 A1 | 7/2012 |
| WO | 2017204716 A1 | 11/2017 |

OTHER PUBLICATIONS

Extended European Search Report and Written Opinion issued in European Patent Application No. 20183522.0, dated Oct. 16, 2020, in 8 pages.

* cited by examiner

*Primary Examiner* — Christopher J. Novosad
(74) *Attorney, Agent, or Firm* — Taft Stettinius & Hollister LLP; Stephen F. Rost

(57) ABSTRACT

An agricultural implement for distributing fertilizer to a plurality of rows includes a fertilizer container, a plurality of fertilizer metering units, and a plurality of motors. The fertilizer containers are used for storing the fertilizer prior to the fertilizer being distributed to the soil. The plurality of fertilizer metering units each include a housing and a metering device positioned in the housing. The housing has an inlet configured to receive fertilizer from the fertilizer container and an outlet. The plurality of motors are each drivingly coupled to and configured to rotate at least one metering device to distribute fertilizer to a row of the plurality of rows.

12 Claims, 5 Drawing Sheets

FERTILIZER METER WITH MOTOR CONTROL AND METHOD THEREOF

FIELD OF THE DISCLOSURE

The present disclosure relates to an agricultural planter or implement, and in particular, to fertilizer metering in an agricultural planter or implement.

BACKGROUND OF THE DISCLOSURE

An agricultural machine or implement such as a row crop planter applies seed or fertilizer to a field. Some agricultural implements are capable of depositing fertilizer at the same time as seeding. The fertilizer can include gaseous, liquid, or dry granular fertilizer, which may be housed in a container prior to being applied to the field. With some of these implements, particularly when applying a dry granular fertilizer, a metering mechanism is located below the container and includes a metering device such as an auger or fluted feed roller that is rotatably mounted within the metering mechanism to move the fertilizer from the metering mechanism to a row of the field at a controlled rate. The manufacturing process as well as normal wear and tear may introduce structural variation or differences in size and shape into the population of metering devices, even on a single implement. The variation in the size and shape of metering devices causes the fertilizer distribution rate to vary between metering mechanisms, even when driven by a common motor at a common drive speed. Unequal or uncontrolled fertilizer distribution rates may result in over or under fertilized crops. Challenges may exist with regard to controlling the distribution rates of fertilizer, especially because implements often fail to account for differences in the size and shape of metering devices.

SUMMARY

In one embodiment of the present disclosure, an agricultural implement adapted to be moved over soil to distribute fertilizer to a plurality of rows may include a fertilizer container; a plurality of fertilizer metering units that may each include (i) a housing having an inlet configured to receive fertilizer from the fertilizer container and an outlet, and (ii) a metering device that may be positioned in the housing and configured rotate to move fertilizer through the outlet of the fertilizer metering unit; and, a plurality of motors each drivingly coupled to and configured to rotate at least one metering device.

In a first example of this embodiment, the number of motors included in the plurality motors may be equal to the number of fertilizer metering units included in the plurality of fertilizer metering units. In a second example, each motor of the plurality of motors may be configured to rotate the metering device coupled thereto at a speed different from the speed at which any other metering device is rotated to move fertilizer through the outlet of each fertilizer metering unit at a predefined distribution rate. In a third example, each motor of the plurality of motors may be configured to stop, start, and adjust the speed of the metering device coupled thereto without affecting the speed of any other metering device during operation of the implement.

In a fourth example, the plurality of motors may include (i) a first motor configured to rotate the at least one metering device coupled thereto at a first speed to distribute fertilizer at a first predefined distribution rate and (ii) a second motor configured to rotate another at least one metering device coupled thereto at a second speed to distribute fertilizer at a second predefined distribution rate, wherein the second speed is different than the first speed. In a fifth example, the first predefined distribution rate may be different than the second predefined distribution rate.

In a sixth example, the plurality of motors may include a third motor configured to rotate at least one metering device coupled thereto at a third speed to distribute fertilizer at a third distribution rate, the third speed is different than the first speed and the second speed, and the third predefined distribution rate is equal to the first predefined distribution rate and the second predefined distribution rate.

In a seventh example, the implement may be reconfigurable between (i) a wide-planting position, in which each motor of the plurality of motors is drivingly coupled to and rotates between three and four metering devices, and (ii) a narrow-planting position, in which each motor of the plurality of motors is drivingly coupled to and rotates between four and five metering devices.

In an eighth example, each motor of the plurality of motors may be drivingly coupled to and rotate no more than eight metering devices. In a ninth example, the agricultural implement may comprise a plurality of hoses each coupled to the outlet of a fertilizer metering unit, and each of the plurality of hoses may be configured to direct fertilizer from the outlet of the fertilizer metering unit to a single row of the plurality of rows.

In another embodiment of this disclosure, an agricultural row crop planter may include a plurality of motors each couple to and configured to drive rotation of a corresponding drive shaft; a fertilizer container; and a plurality of fertilizer metering units coupled to the fertilizer container. Each fertilizer metering unit of the plurality of fertilizer metering units may be configured to receive fertilizer from the fertilizer container and may include a metering device that is coupled to and rotationally driven by a drive shaft of the plurality of drive shafts to distribute fertilizer to one of the plurality of rows.

In one example of this embodiment, each drive shaft may be configured to be driven at a different speed from every other drive shaft, such that each drive shaft may be configured to rotate at least one metering device that is coupled thereto at a speed required to achieve a predefined fertilizer distribution rate.

In a second example, a ratio of the number of fertilizer metering units included in the plurality of fertilizer metering units to the number of motors included in the plurality of motors may be no greater than 5:1. In a third example, a ratio of the number of fertilizer metering units included in the plurality of fertilizer metering units to the number of motors included in the plurality of motors may be no greater than 4:1. In a fourth example, a ratio of the number of fertilizer metering units included in the plurality of fertilizer metering units to the number of motors included in the plurality of motors may be 1:1.

In a fifth example, each motor of the plurality of motors may be configured to stop, start, and adjust a fertilizer distribution rate associated with at least one metering device that is coupled to the corresponding drive shaft without affecting a fertilizer distribution rate associated with any metering device that is not coupled to the corresponding drive shaft.

In a further embodiment of the present disclosure, a method for precision-controlling a plurality of fertilizer metering assemblies adapted for use in an agricultural implement may include positioning a plurality of fertilizer receptacles to receive fertilizer output from a plurality of fertilizer metering assemblies; providing fertilizer to the plurality of fertilizer metering assemblies, wherein each fertilizer metering assembly includes at least one fertilizer metering unit; operating a plurality of motors at a common speed to drive rotation of metering devices that are each coupled to a motor of the plurality of motors and included in a fertilizer metering unit; measuring a mass of fertilizer received in each fertilizer receptacle; assigning each fertilizer metering assembly of the plurality of fertilizer metering assemblies a calibration factor based on the mass of fertilizer receive in the corresponding fertilizer receptacle.

In one example of this embodiment, the method may include selecting a target fertilizer distribution rate common to each of the plurality of fertilizer metering assemblies; and operating each motor at a different calibrated operating speed based on the calibration factor of the metering assembly associated with the motor, such that each fertilizer metering assembly distributes fertilizer at the selected target fertilizer distribution rate.

In a second example, each motor of the plurality of motors drives rotation of one metering device, and each fertilizer metering assembly of the plurality of fertilizer metering assemblies includes only one fertilizer metering unit.

In a third example, the method may include starting, stopping, or adjusting the operating speed of at least one motor of the plurality of motors without affecting the operating speed of any other motor of the plurality of motors in response to at least one of topography, soil type, yield data, and the presence or absence of earlier-distributed fertilizer.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
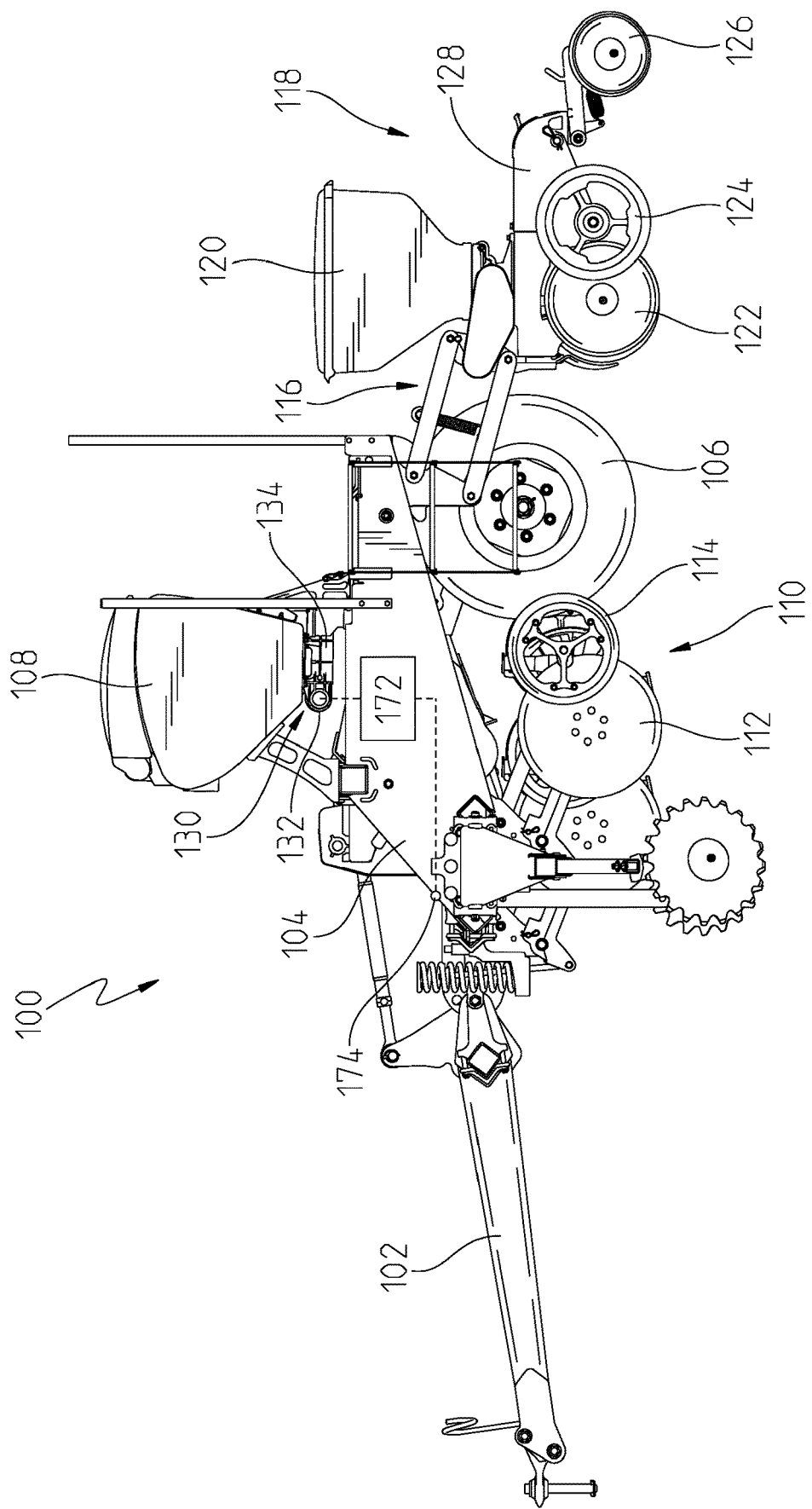
FIG. 1 is a side view of a planting implement.

Referring to FIG. 1 of the present disclosure, a row crop planting unit or implement 100 is shown. The planting implement 100 may include a main frame 104 to which a tow bar 102 is attached to allow the implement to be coupled to an agricultural machine such as a tractor (not shown). The implement 100 may include one or more wheels 106 for traversing along the soil or ground.

The planting implement 100 may include a plurality of planting units 118 attached to the main frame 104 thereof. In FIG. 1, a single planting unit 118 is shown attached to the main frame 104 via a parallel linkage 116. The parallel linkage 116 allows for independent vertical movement of the planting unit 118 as it traverses along uneven ground.

Each planting unit 118 may include its own frame 128 to which a seed container 120 is coupled. The seed container 120 may store seed to be planted by the planting unit 118 during a planting operation. Seed may be deposited within a trench or furrow formed by a trench-forming disk 112. The depth at which the trench-forming disk 112 is set relative to the soil may be set by a gauge wheel 124 and a depth-setting mechanism (not shown). A pair of closing wheels 126 may be further coupled to the frame 128 of the planting unit 118 in order to close or cover the trench with soil.

A fertilizer applicator or single disk fertilizer opener assembly 110 is shown coupled to the main frame 100 of the planting implement 100. As shown, the assembly 110 may include a container 108 for storing fertilizer, e.g., dry granular fertilizer, or a tank for storing gaseous or liquid fertilizer. The single disk fertilizer opener assembly 110 may further include a cutting disk 112 and a gauge wheel 114. The cutting disk 112 may be set at a defined depth into the soil to form a furrow or trench therein. The gauge wheel 114 may be used to set the depth of the furrow or trench to be formed by the cutting disk 112.

Figure 2:
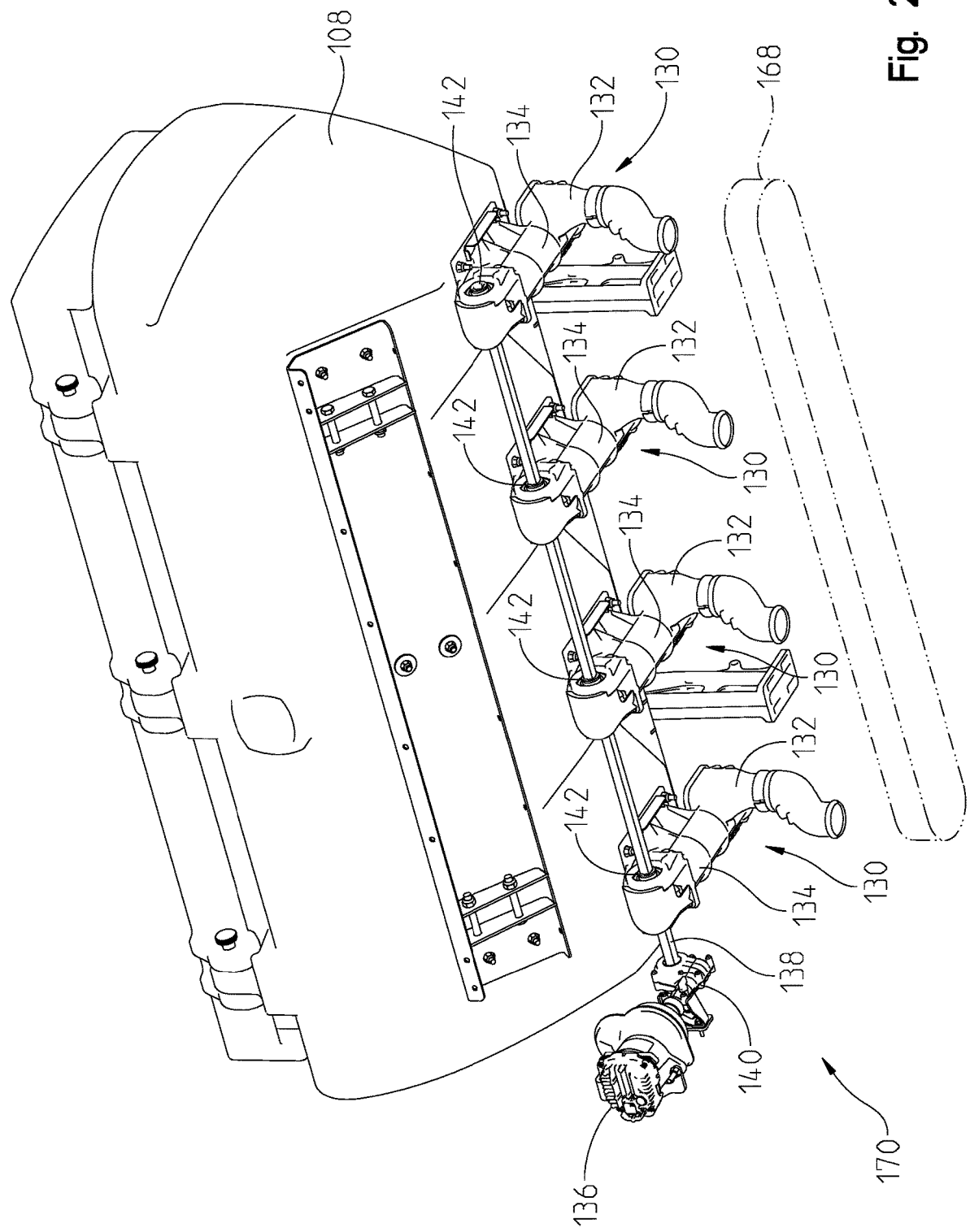
FIG. 2 is a perspective view of a fertilizing portion of the implement of FIG. 1 including a fertilizer container, a plurality of fertilizer metering units coupled to fertilizer container, and motor drivingly coupled to the plurality of fertilizer metering units.

As shown in FIGS. 1-2, a plurality of fertilizer metering units 130 are coupled downstream of the container 108 and configured to receive fertilizer from the container 108. Each fertilizer metering unit 130 includes a housing 132 and a metering device 134. The metering device 134 is positioned in the housing 132 and configured to move fertilizer through the metering unit 130. The metering device 134 may be, for example, a metering auger, a fluted feed roller, or any other suitable metering device capable of moving fertilizer through the metering unit 130.

Planting implements, such as the implement 100, may come in a variety of different sizes and may be used in a several different planting applications. For example, an implement may be configured to plant a first crop with forty-five centimeter (45 cm) row spacing, in which case the implement facilitates simultaneous planting of twenty-two rows. The same implement may also be configured to plant a second crop, which requires thirty-eight centimeter (38 cm) row spacing, in which case the implement facilitates simultaneous planting of twenty-five rows. Because the number of simultaneously planted rows is subject to change in each planting application, the metering devices 134 on a given implement are used with different frequencies. Differing usage frequencies, leads to differing amounts of wear and tear on each individual metering device 134. The unique level of wear and tear along with slight differences in manufacturing leads to variation in the size and shape of each metering device 134, which results in variation in the fertilizer distribution rate of each metering device 134.

As suggested by FIG. 2, the fertilizer distribution rate of one or more metering devices 134 may be adjusted by a motor 136 coupled to one or more fertilizer metering units 130. In the illustrative embodiment, the motor 136 is an electric motor coupled to at least one fertilizer metering unit 130 by a drive shaft 138. As shown in FIG. 2, the drive shaft 138 is coupled between a gearbox 140 of the motor 136 and bevel gear 142 of the fertilizer metering unit 130. It should be appreciate that while an exemplary rotational drive arrangement is shown in FIG. 2, the metering device 134 may be driven by any suitable motor and facilitating linkages.

Figure 3:
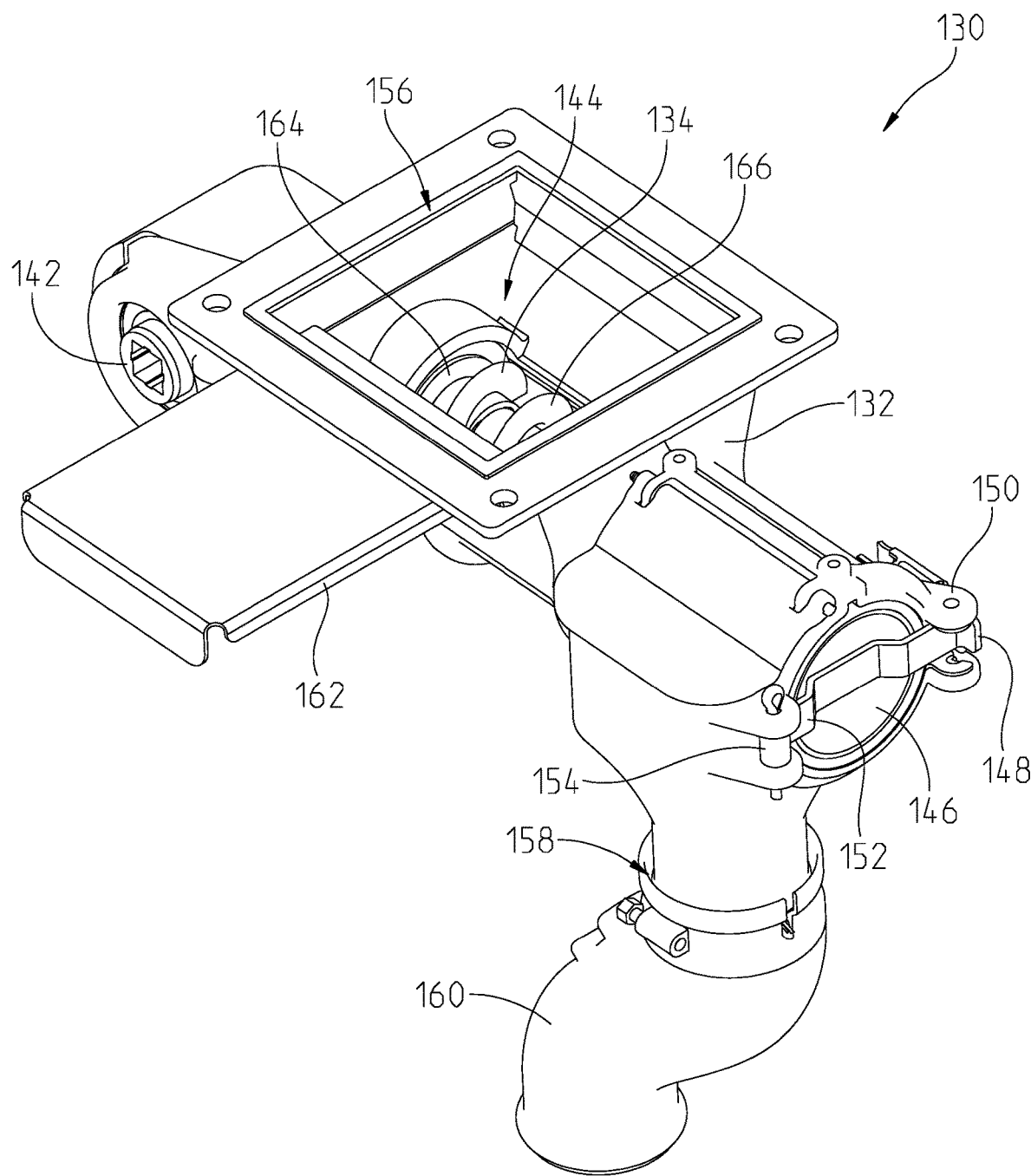
FIG. 3 is a perspective view a fertilizer metering unit of FIG. 2.

As shown in FIG. 3, the fertilizer metering unit 130 includes the housing 132 and the metering device 134 positioned in an interior portion 144 of the housing 132. In the illustrative embodiment, the housing 132 includes an access door 146 having a first end 148 and a second end 152. The first end 148 is pivotably coupled to a rear portion 150 of the housing 132, and the second end 152 includes a locking mechanism 154 configured to secure the access door 146 in a closed position, as shown in FIG. 3. As suggested in FIG. 3, the access door 146 is movable from the closed position to an open position to provide access to the metering device 134.

Referring still to FIG. 3, the housing 132 includes an inlet 156 and an outlet 158, and the interior portion 144 of the housing 132 is defined between the inlet 156 and the outlet 158. A hose 160 is fluidly coupled to the housing 132 at the outlet 158 and configured to direct fertilizer from the outlet 158 of the fertilizer metering unit 130 to a single (one) row of the field as the implement 100 traverses the field. It should be appreciated that, unlike an air seeder which distributes seed from a single metering unit to several rows simultaneously, each metering unit 130 is coupled to a hose 160 to distribute fertilizer to a single row. In some embodiments the metering unit 130 may distribute fertilizer to a single row without the use of the hose 160.

In some embodiments, a cover 162 is slidingly coupled to the housing 132 at the inlet 156. The cover 162 is configured to slide relative to the housing 132 from (i) a first position, in which the cover is aligned with the inlet 156 of the housing 132 to prevent fertilizer from entering the interior 144 of the housing 132, to (ii) a second position, in which the cover 162 is positioned adjacent the inlet 156 of the housing 132 to allow fertilizer pass through the inlet 156 and enter the interior 144 of the housing 132.

When fertilizer enters the interior 144 of the housing 132, the fertilizer may be moved in a rearward direction by the metering device 134 toward the outlet 158 of the housing 132. In the illustrative embodiment, the metering device 134 is shown as a metering auger and includes a base 164 and a spiral 166 fixedly coupled to the base 164. The bevel gear 142 (and thereby the drive shaft 138, the gearbox 140, and the engine 136) is/are coupled to the base 164 of the metering device 134 to drive rotational movement of the metering device 134 relative to the housing 132. As such, when the motor 136 rotates the metering device 134, the spiral 166 of the metering auger contacts fertilizer and forces the fertilizer to exit the housing 132. In this arrangement, the rotational speed of a motor 136 determines the fertilizer distribution rate for each metering unit 134 coupled to that motor 136. However, because the metering device 134 is subject to slight differences in manufacturing and has a unique level of wear and tear, each metering unit 130 may have a different fertilizer distribution rate, even when driven by a common motor 136.

Figure 4:
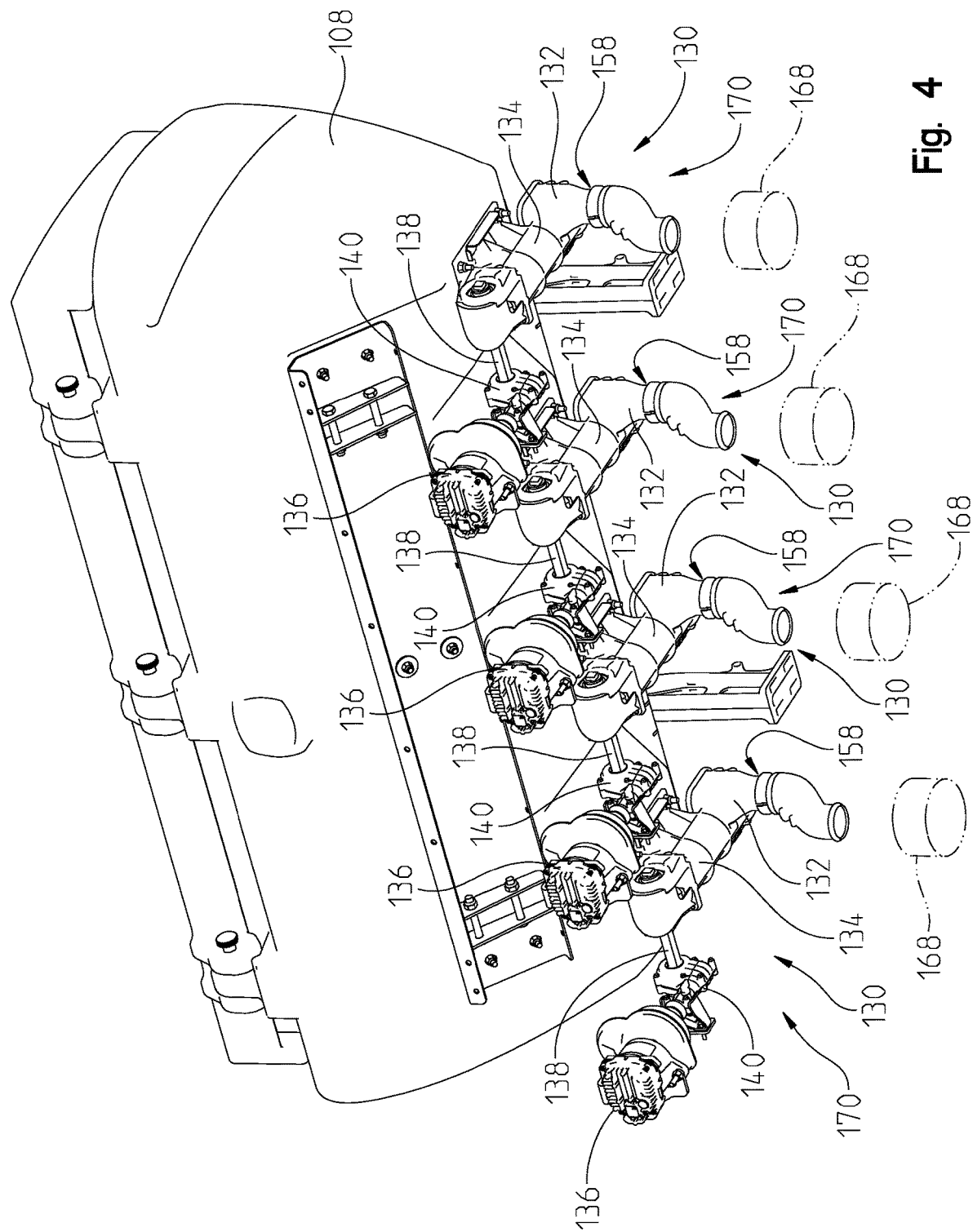
FIG. 4 is a perspective view of a fertilizing portion of the implement similar to FIG. 2, showing that each fertilizer metering unit may be drivingly coupled to a separate motor.

In the illustrative embodiment shown in FIG. 4, to achieve a predefined distribution rate for each fertilizer metering unit 130, a separate motor 136 is coupled to each fertilizer metering unit 130. Each motor 136 is coupled to and configured to drive rotation of a corresponding drive shaft 138, which in turn, drives rotation of a corresponding metering device 134. In this arrangement, each motor 136 is configured to rotate the metering device 134 coupled thereto at a speed different from the speed at which any other metering device 134 of the implement 100 is rotated. The unique rotational speed of each metering device 134 moves fertilizer through the outlet 158 of each fertilizer metering unit 130 at the predefined distribution rate. The predefined distribution rate may be a target fertilizer distribution rate chosen for a particular fertilizer metering unit 130, a fertilizer distribution rate common to each fertilizer metering unit 130 included on the implement 100, or both. In the illustrative embodiment, each motor 136 is configured to stop, start, and adjust the speed of the metering device 134 coupled thereto without affecting the speed of any other metering device 134 during operation of the implement 100.

In some embodiments, the implement 100 may be reconfigurable between a wide-planting position and a narrow-planting position. In the wide-planting position, the machine may operate as a twenty-two row planter (having twenty-two metering units 130) with approximately forty-five centimeters of spacing between each row. In the narrow-planting position, the machine may operate as a twenty-five row planter (having twenty-five metering units 130) with approximately thirty-eight centimeters of spacing between each row. In the narrow-planting position, a single motor 136 is coupled to each container 108, at least one motor 136 is drivingly coupled to and rotates five metering devices 134 while other motors 136 are drivingly coupled to and rotate four metering devices 134. In the wide-planting position, a single motor 136 is coupled to each container 108, a plurality of motors 136 are drivingly coupled to and rotate three metering devices 134 while other motors 136 are drivingly coupled to and rotate four metering devices 134. In the wide-planting position and the narrow-planting position, each motor 136 is configured to stop, start, and adjust the speed of the metering device 134 coupled thereto without affecting the speed of any other metering device 134 during operation of the implement 100.

In an illustrative embodiment, an implement may be disposed in a twenty-two row planter configuration. In the illustrative embodiment, a ratio of the number of fertilizer metering units 130 included in the plurality of fertilizer metering units 130 to the number of motors 136 included in the plurality of motors 136 is no greater than 4:1. In an illustrative embodiment, an implement may be configured in a twenty-five row planter configuration. In the illustrative embodiment, a ratio of the number of fertilizer metering units 130 included in the plurality of fertilizer metering units 130 to the number of motors 136 included in the plurality of motors 136 is no greater than 5:1.

Figure 5:
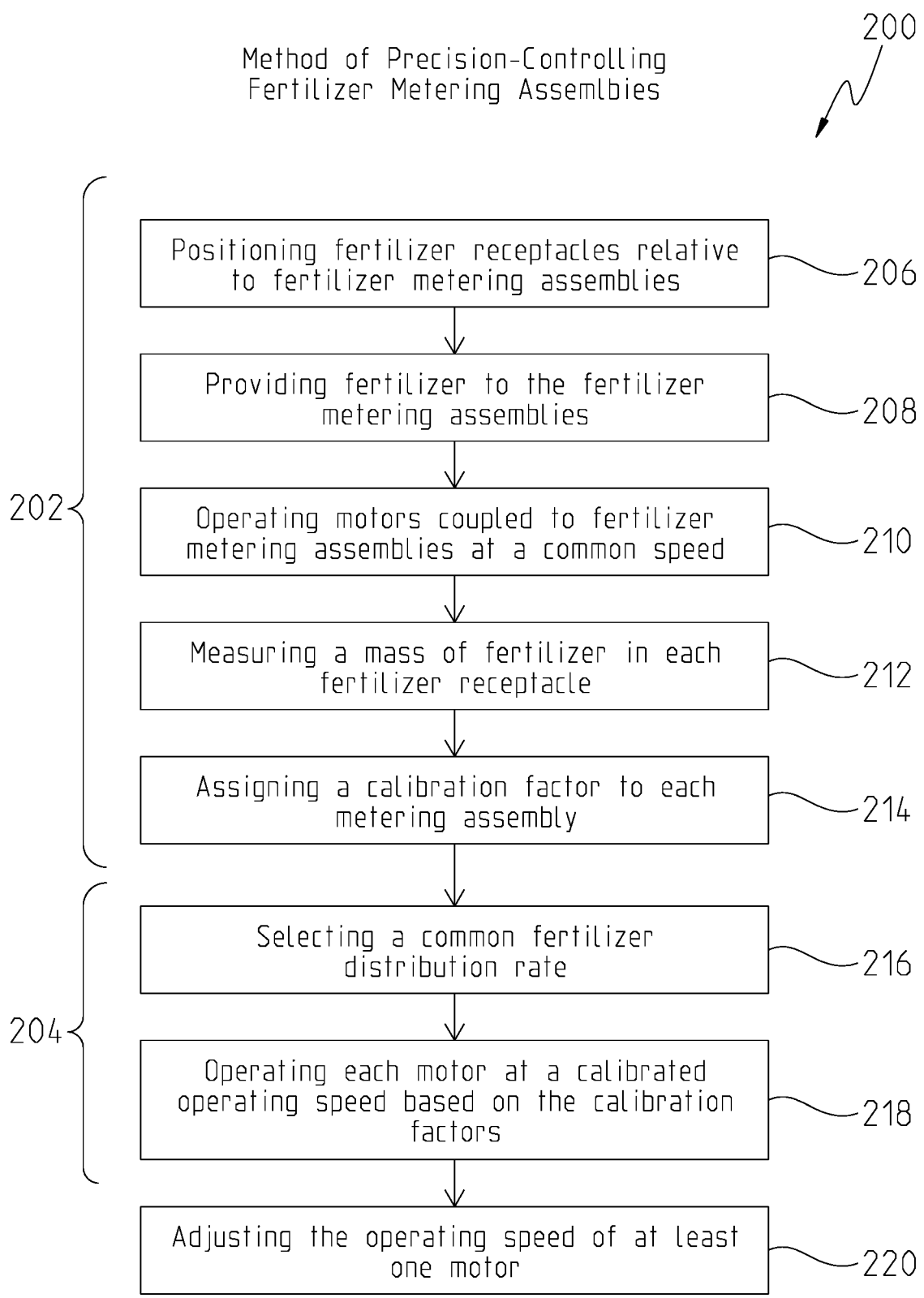
FIG. 5 is flow chart showing a method of precision-controlling fertilizer metering assemblies that each include a fertilizer metering unit.

In an illustrative embodiment, fertilizer metering assemblies 170 (see FIGS. 2 and 4) that each include at least one fertilizer metering unit 130, may be precision-controlled according to the method 200, as shown in FIG. 5. Each fertilizer metering assembly 170 is first calibrated according to a calibration method 202. The calibration method 202 includes a positioning step 206, a providing step 208, an operating step 210, a measuring step 212, and an assigning step 214. The positioning step 206 includes positioning a least one fertilizer receptacle 168 (see FIGS. 2 and 4) to receive fertilizer output from a plurality of fertilizer metering assemblies 170. The providing step 206 includes providing fertilizer to the plurality of fertilizer metering assemblies 170, wherein each fertilizer metering assembly 170 includes at least one fertilizer metering unit 130.

The method 200 may include a step 207 of providing fertilizer to a fertilizer container 108, prior to the providing step 206. The operating step 208 includes operating a plurality of motors 136 at a common speed to drive rotation of metering devices 134 that are each coupled to a motor 136 and housed in an a housing 132 of a fertilizer metering unit 130. Fertilizer is collected in the fertilizer receptacle(s) 168 while the motors 136 are driven at the common operating speed. In the illustrative embodiment, in the operating step 208, each motor 136 on the fertilizer portion of the implement 100 may be driven at the common operating speed.

The measuring step 210 includes measuring a mass of fertilizer received or collected in each fertilizer receptacle 168. The fertilizer may be collected over a selected amount of time, and the number of rotations of each metering device 134 may be selected or tracked over time. The mass of fertilizer collected may be represented as mass per revolution of each metering device 134 or mass per time.

The assigning step 214 includes assigning each fertilizer metering assembly 170 of the plurality of fertilizer metering assemblies 170 a calibration factor based on the mass of fertilizer receive by the corresponding fertilizer receptacle 168. In the illustrative embodiment, the calibration factor is a numerical value associated with each metering assembly 170 to represent the mass of fertilizer output by the metering assembly 170 relative to that of the other metering assemblies 170 of the implement 100 when each metering assembly 170 is driven at a common operating speed. The calibration factor may be used to identify and account for differences in fertilizer distribution rates of different metering assemblies 170, as will be described in greater detail below.

In the illustrative embodiment, each metering assembly 170 may have a different calibration factor. This is because each metering assembly 170 includes different metering devices 134, and each metering device 134 may have a unique level of wear and tear and slight differences in manufacturing, which leads to variation in the size and shape of each metering device 134. As described above, the unique size and shape of each metering device 134 leads to different fertilizer distribution rates associated with each metering device 134, and therefore, differing amounts of fertilizer are distributed by each metering device 134 when the metering devices 134 are driven at a common speed. This results in different calibration factors for each metering assembly 170 based on the unique size and shape of the metering devices 134 included in a given metering assembly 170.

Referring still to FIG. 5, the precision-controlling method 200 further includes a method 204 of distributing fertilizer at a common distribution rate. The method 204 includes a selecting step 216 and an operating step 218. The selecting step 216 includes selecting a target fertilizer distribution rate common to each fertilizer metering assembly 170. As suggested above, the different calibration factors represent differences in fertilizer distribution rates of different metering assemblies 170. Specifically, the calibration factor is used to obtain a calibrated operating speed of each motor 136 in the operating step 218. The operating step 218 includes operating each motor 136 at a different calibrated operating speed based on the calibration factor of the fertilizer metering assembly 170 (which includes the metering unit 130), which includes the metering device 134, that is coupled to the motor 136, such that each fertilizer metering assembly 170 outputs fertilizer at the selected fertilizer distribution rate.

In other words, the operating step 218 includes operating a motor 136 of the implement 100 at a calibrated operating speed based on the calibration factor of the fertilizer metering assembly 170 associated with the motor 136, such the fertilizer metering assembly 170 outputs fertilizer at the selected target fertilizer distribution rate.

By way of example, in the illustrative embodiment, a low-output fertilizer metering assembly 170 may output a below-average mass of fertilizer relative to other fertilizer metering assemblies 170 of the implement 100. The low-output fertilizer metering assembly 170 may be assigned a proportionally above-average calibration factor that is associated with a proportionally above-average operating speed of the motor 136 coupled thereto. When the motor 136 is operated at the above-average operating speed (relative to other motors 136 of the implement 100), the low-output fertilizer metering assembly 170 distributes fertilizer at the selected target fertilizer distribution rate.

In some embodiments, each fertilizer metering assembly 170 includes a plurality of fertilizer metering units 130 each having a metering device 134 driven by a common motor 136. In such embodiments, the mass of fertilizer received in the fertilizer receptacle 168 is the sum of fertilizer distributed by each fertilizer metering unit 130 included in the corresponding fertilizer metering assembly 170.

In some embodiments, each fertilizer metering assembly 170 includes only one fertilizer metering unit 130. In such embodiments, a single motor 136 drives rotation of only one metering device 134, and therefore, the mass of fertilizer received in each fertilizer receptacle 168 is associated with the size and shape of only one metering device 134. As such, each calibration factor and each calibrated operating speed is specific to a single metering device 134. In this arrangement, each metering device 134 of an implement 100 can be individually calibrated and controlled to distribute fertilizer at a distribution rate unique to that metering device 134.

In some embodiments, the method 200 may include an adjusting step 220, which includes adjusting the operating speed of at least one motor 136 without affecting the operating speed of any other motor 136 of the implement 100. The adjustment of the operating speed may be made in response to at least one of topography, soil type, yield data, and the presence or absence of earlier-distributed fertilizer. More specifically, the operating speed of at least one motor 136 may be adjusted to achieve a predetermined fertilizer distribution rate for an associated metering assembly 170, and the predetermined fertilizer distribution rate is selected based on at least one of topography, soil type, yield data, and the presence or absence of earlier-distributed fertilizer.

In some embodiments, subsequent to the completion of the calibration method 202, the method 200 of precision-controlling fertilizer metering assemblies may advance directly to step 220. As such, after the metering assemblies 170 are each assigned a calibration factor, the operating speed of at least one motor 136 may be adjusted. The operating speed of the at least one motor 136 may be adjusted to achieve a predetermined fertilizer distribution rate based on the calibration factor assigned to the associated metering assembly 170. In some embodiments, the operating speed of at least one motor 136 may be adjusted without performing the steps 202 and/or 204.

In some embodiments, each motor 136 is controlled a controller 172 (see FIG. 1). The controller 172 may adjust the operating speed of each motor 136 in response to at least one of topography, soil type, yield data, and the presence or absence of earlier-distributed fertilizer. Further, the controller 172 may be coupled to a sensor 174 (see FIG. 1) configured to sense at least one of topography, soil type, presence or absence of earlier-distributed fertilizer. Yield data may include yield data from a prior harvest at various locations in a field. Soil type may include moisture level of the soil and/or other nutrient levels associated with the soil. It should be appreciated that the predefined fertilizer distribution rate and the selected fertilizer distribution rate may also be based on at least one of topography, soil type, or yield data.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural implement adapted to be moved over soil and distribute fertilizer to a plurality of rows, the agricultural implement comprising:
a fertilizer container;
a plurality of fertilizer metering units each configured to distribute fertilizer to one of the plurality of rows and including (i) a housing having an inlet configured to receive fertilizer from the fertilizer container and an outlet, and (ii) a metering device positioned in the housing and configured to rotate to move fertilizer through the outlet of the fertilizer metering unit in response to being driven by a first drive shaft of a plurality of drive shafts, wherein the metering device includes a metering auger having a spiral shaped to move fertilizer in a rearwardly direction through the housing toward the outlet of the housing; and
a plurality of motors each drivingly coupled to a corresponding drive shaft included in the plurality of drive shafts and each configured to rotate the spiral of at least one metering device.

2. The agricultural implement of claim 1, wherein the number of motors included in the plurality of motors is equal to the number of fertilizer metering units included in the plurality of fertilizer metering units.

3. The agricultural implement of claim 2, wherein each motor of the plurality of motors is configured to rotate the metering device coupled thereto at a speed different from the speed at which any other metering device is rotated to move fertilizer through the outlet of each fertilizer metering unit at a predefined distribution rate.

4. The agricultural implement of claim 2, wherein each motor of the plurality of motors is configured to stop, start, and adjust the speed of the metering device coupled thereto without affecting the speed of any other metering device during operation of the agricultural implement.

5. The agricultural implement of claim 1, wherein the plurality of motors includes (i) a first motor configured to rotate the at least one metering device coupled thereto at a first speed to distribute fertilizer at a first predefined distribution rate and (ii) a second motor configured to rotate at least one metering device coupled thereto at a second speed to distribute fertilizer at a second predefined distribution rate, wherein the second speed is different than the first speed.

6. The agricultural implement of claim 5, wherein the first predefined distribution rate is different than the second predefined distribution rate.

7. The agricultural implement of claim 5, wherein:
the plurality of motors includes a third motor configured to rotate at least one metering device coupled thereto at a third speed to distribute fertilizer at a third predefined distribution rate,
the third speed is different than the first speed and the second speed, and
the third predefined distribution rate is equal to the first predefined distribution rate and the second predefined distribution rate.

8. The agricultural implement of claim 1, wherein the implement is reconfigurable between (i) a first planting position, in which each motor of the plurality of motors is drivingly coupled to and rotates between three and four metering devices, and (ii) a second planting position, in which each motor of the plurality of motors is drivingly coupled to and rotates between four and five metering devices.

9. The agricultural implement of claim 1, wherein each motor of the plurality of motors is drivingly coupled to and rotates no more than eight metering devices.

10. The agricultural implement of claim 1, further comprising:
a plurality of hoses each coupled to the outlet of a fertilizer metering unit, wherein each of the plurality of hoses is configured to direct fertilizer from the outlet of a fertilizer metering unit to a single row of the plurality of rows.

11. The agricultural implement of claim 1, wherein:
each of the plurality of drive shafts is arranged to extend along a first axis, and
the metering device is driven for rotation by the first drive shaft about a second axis that intersects the first axis.

12. The agricultural implement of claim 11, wherein the second axis is perpendicular to the first axis.

\* \* \* \* \*